US005541250A

United States Patent [19]

Hudson et al.

[11] Patent Number: 5,541,250
[45] Date of Patent: Jul. 30, 1996

[54] GELS

[75] Inventors: John M. Hudson, Swindon, England; Hendrik Graulus, Sunnyvale; Allen C. Nixon, Brisbane, both of Calif.

[73] Assignee: Raychem Limited, Swindon, United Kingdom

[21] Appl. No.: 199,257

[22] PCT Filed: Sep. 7, 1992

[86] PCT No.: PCT/GB92/01627

§ 371 Date: Mar. 4, 1994

§ 102(e) Date: Mar. 4, 1994

[87] PCT Pub. No.: WO93/05113

PCT Pub. Date: Mar. 18, 1993

[30] Foreign Application Priority Data

Sep. 6, 1991 [GB] United Kingdom ............... 9119261

[51] Int. Cl.$^6$ ................................................ C08L 53/00
[52] U.S. Cl. ................................. 524/505; 526/340
[58] Field of Search .......................... 524/505; 526/340

[56] References Cited

U.S. PATENT DOCUMENTS 4,080,348 3/1978 Korpman ..................... 260/27 BB
4,136,071 1/1979 Korpman ..................... 260/27 BB
4,833,193 5/1989 Sieverding ........................ 524/505

FOREIGN PATENT DOCUMENTS

| 0146163A2 | 6/1985 | European Pat. Off. ........ C08L 95/00 |
| 0240044A2 | 10/1987 | European Pat. Off. ........ C08L 51/00 |
| 0319236A2 | 6/1989 | European Pat. Off. .......... C09J 3/14 |
| 2019416 | 10/1979 | United Kingdom ........... C08L 53/00 |
| WO90/05166 | 5/1990 | WIPO .............................. C08L 53/00 |
| WO91/05014 | 4/1991 | WIPO .............................. C08L 53/00 |

Primary Examiner—Edward J. Cain
Attorney, Agent, or Firm—Herbert G. Burkard; Yuan Chao; A. Stephen Zavell

[57] ABSTRACT

Gels made of 100 parts of Styrene-elastomer-styrene triblock copolymers and more than 300 parts of an oil which softens and extends the elastomer mid-block of the copolymer are rendered resistant to oil exudation under pressure by incorporation of a styrene-elastomer diblock copolymer. Preferred triblocks are styrene-ethylene/butylene-styrene and preferred diblocks are styrene-ethylene/propylene. Use of the gels as sealants in enclosures for electrical connections designed to hold the gel under compression is disclosed.

25 Claims, No Drawings

GELS

This invention relates to a gel composition, preferably a soft, high temperature-slump-resistant, springy gel composition, by which is meant a liquid-extended polymer composition having a cone penetration value measured by a modified version of ASTM D217, as described in WO8800603 (RK308), the disclosure of which is incorporated hereto by reference, within the range from 100 to 400, (preferably 100 to 350), $10^{-1}$ millimetres; an ultimate elongation (measured by ASTM D412 as described in WO8800603) greater than 100%, with substantially elastic deformation (i.e. substantially no hysteresis) to an elongation of at least 100%; ultimate tensile strength (modified ASTM D412 as described in WO8800603) less than 1 MegaPascal; dynamic storage modulus (as described in WO8800603) less than 50000 Pascals; and substantially zero slump at temperatures up to 120° C., preferably 150° C., especially 180° C. The composition may either contain a three-dimensional network of cross-linked molecular chains (gels) or may merely behave as if it contained such a network (gelloids), both being included in the term "gels" as used hereinafter.

The invention is more particularly concerned with such gel compositions comprising a styrene-elastomeric block-styrene triblock copolymer, preferably a styrene-alkylene-styrene block copolymer having relatively hard polystyrene end blocks and relatively elastomeric (preferably hydrogenated rubber) mid-block. Examples of such copolymers include polystrene-polybutadiene-polystyrene (SBS) and polystyrene-poly(ethylene/butylene) polystyrene (SEBS) triblock copolymers.

These soft, slump-resistant, springy, triblock copolymer gels with which the present invention is concerned, hereinafter referred to for brevity as "S-Gels", are well suited, inter alia, for re-enterable sealing of electrical connection enclosures. Examples of such S-Gels are described in WO90/05166 (RK403).

In use, it is often desirable to hold these gels under compression, the pressure encountered in practice being reasonably simulated in the laboratory by applying pressure of 50 kPa to 15 mm diameter round discs of the gel. At such pressures we have discovered that the S-gels containing more than 400 parts by weight, especially more than 500 parts by weight, of the extender liquid per 100 parts by weight of the gel-forming block copolymer (i.e. less than 20%, especially less than 16.79% copolymer) tend to suffer from exudation of the extender liquid. At higher pressures, gels containing as little as 300 parts by weight of the extender liquid per 100 parts by weight of the block copolymer may also suffer from such exudation. Gels of higher copolymer content are less affected by such exudation, but tend to be too firm for many of the purposes to which S-gels are put. The present invention reduces such exudation without unacceptably altering the other properties of the gel and also reduces the need for added tackifiers, for example hydrogenated styrenic tackifier resins, or liquid polybutene or liquid polyisoprene tackifiers.

The invention accordingly provides a gel composition comprising:

(a) a styrene-elastomeric block-styrene triblock copolymer (T), (b) a hard block-elastomeric block diblock copolymer (D), the elastomeric block of which is compatible with extender E (specified below), the amount of D being sufficient to reduce by at least 10% the exudation of E from the composition when under compression in use; and (c) more than 300, preferably more than 400, especially at least 500, parts by weight of extender liquid (E) per 100 parts by weight of T+D, which liquid extends and softens the elastomeric blocks of T and of D.

the composition containing more than 3.1% of T by weight, based on the whole composition and/or containing less than 20% by weight based on the whole composition of added hydrogenated styrenic tackifier resin, preferably of any added tackifier.

The composition will usually have, or may be adjusted by simple trial and error to have, a cone penetration value within the range from 100 to 400, (preferably 100 to 350), ($10^{-1}$ millimetres); an ultimate elongation greater than 100%, with substantially elastic deformation to an elongation of at least 100%; ultimate tensile strength less than 1 MegaPascal; dynamic storage modulus less than 50000 Pascals; and substantially zero slump at temperatures up to 120° C.

The weight ratio of D:T is preferably within the range from 5:95 to 66:34. The triblock copolymer (T) preferably has a weight average molecular weight (Mw) of at least 120 000, more preferably at least 150 000, especially at least 180 000, and the diblock copolymer (D) preferably has Mw of 100000–200000, although the Mw of D is less critical than that of T. The Mw may be determined as described in the aforementioned WO90/05166.

The benefits of the diblock additive D are especially apparent in gels containing at least 600, or at least 900, or at least 1300, parts by weight of E per 100 parts by weight of T+D.

Preferably, the weight of D included is up to 16.5. more preferably 13, percent and/or the weight of T included is up to 23.75, more preferably 19, percent, of the total weight of the composition, provided that the combined weight of T and D is not more than 25, more preferably 20, percent, and especially preferably not more than 16.7 percent, of the total weight of the composition. The amount of D is preferably sufficient to reduce the exudation of E by at least 20%, preferably at least 25%, more preferably at least 35%, or especially preferably at least 50%. T and D together preferably constitute substantially all of the polymer content of the gel.

The hard blocks and the elastomeric blocks of D are preferably compatible with, more preferably having the same kind of repeat units as, respectively, the hard blocks and the elastomeric blocks of T. The hard blocks of D preferably comprise polystyrene, and the elastomeric blocks of either or both of T and D preferably comprise polyalkylene blocks, more preferably poly(ethylene/butylene) for T or poly(ethylene/propylene) for D. D preferably incorporates not more than 50, more preferably less than 40, and especially preferably 20 to 39, weight percent of the hard blocks. T preferably incorporates 29 to 35, more preferably 30 or 31 to 33, weight percent of the polystyrene blocks.

Because of their improved resistance to exudation of the extender liquid E, the gel compositions according to the present invention are well suited to use in devices comprising an enclosure for electrical wires or cables or connections, a body of the gel composition, and means for holding the body of gel composition in compression against and around the wires or cables or connections so as to seal the enclosure and/or protect the wires, cables, connections etc. from contamination or corrosion. For these purposes, the body of gel composition may be held in an insert shell for insertion in the enclosure during installation of the device. Examples of such devices are described in the aforementioned WO90/05166 and in WO90/05401 (B161), the disclosures of both of which are incorporated herein by reference. The devices may be capable of closure around an object with one or more bodies of the gel composition carried by the device arranged to make gel-to-gel surface contact upon such closure so as to form a gel-to-gel seal which separates at the contact surfaces upon re-opening of the closure.

The invention also includes the use of the gel composition for forming a seal around an object, or between a first object and a second object, e.g. for corrosion protection or environmental protection, preferably with the gel composition under compression when forming the seal; and the invention includes a method of sealing an enclosure about an object, comprising (a) providing an open enclosure member carrying a body of a gel composition (b) placing the enclosure member about the object and closing the enclosure member, thereby (c) bringing part of the body of gel into sealing surface contact with another part of that body, or with part of another such body of gel carried by the enclosure member, or with the said object, and (d) securing the enclosure member so as to hold the gel composition in the said sealing contact, preferably under compression.

The triblock copolymer T, the other materials other than D, and the general characteristics of the gel composition will preferably be as described in the aforementioned WO90/05166, although copolymers T having slightly lower Mw molecular weights than those preferred in WO90/05166 may be desired for some purposes.

The extender may be as described in WO90/05166, and is preferably a substantially non-aromatic paraffinic/naphthenic mineral oil of paraffinic:naphthenic carbon ratio within the range from 1.75:1 to 5:1, preferably 1.77:1 to 3:1. more preferably 1.9:1 to 2.7:1, and most preferably 2.2:1 to 2.5:1.

Preferably, formulations such as those indicated in WO90/05166 are modified by replacing a portion of the triblock copolymer specified therein with a larger amount of the diblock D according to the present invention. The addition of the diblock D may usefully increase the tack of the gel, thus reducing the need for added tackifiers, which may however be used, for example those described in WO90/01566. further to increase the tack if desired. Preferably, less than 20%, more preferably less than 15%, especially less than 10%, or possibly substantially 0%, of the added tackifier, by weight of the composition, will be used.

Fillers may be added, e.g. up to 10% by weight of the composition, to modify or improve handling characteristics, examples of suitable fillers being readily selected by simple trial. Other additives may be used as described in the aforementioned WO88/00603 and WO91/05014 (RK373) to improve high temperature performance and plasticiser resistance.

The elastomeric block of diblock D must be compatible with the extender E, preferably being wholly soluble therein, or at least extended and softened by E. Copolymer D will be selected to be substantially non-migratory, as opposed to the undesirable exudation of lower Mw materials. This may imply elastomer chain length sufficient to ensure retention in the composition by polymer chain tangling, or may imply hard-block affinity between T and D.

D will preferably be melt-processable under the conditions used for this type of gel composition, and its addition to the composition will preferably not increase, or may even decrease, the modulus measured at 0.1 Hz compared with a gel formed from an equivalent mount of copolymer T alone. The preferred materials are diblock copolymers with one block being compatible with the extender oil. Examples include polystyrene-polyisoprene. polystyrene-polybutadiene, having, for example, 25%, 30% or 48% polystyrene content by weight, polystyrene-poly(ethylene/butylene), polystyrene-poly(ethylene/propylene). For long-term thermal stability the hydrogenated types (polystyrene-poly(ethylene/butylene) or polystyrene-poly(ethylene/propylene)) are preferred.

The following examples are based on 12% of T (Hard S-Gels) or 7% of T (Soft S-Gels) with some of T replaced by a larger amount of diblock D.

Materials

| | |
|---|---|
| SEBS Triblock: | Shell Kraton G1651 |
| | polystyrene-poly(ethylene/butylene)-polystyrene |
| | Styrene content 33%. |
| S-EP Diblock 1: | Shell Kraton G1701X |
| | polystyrene-poly(ethylene/propylene) |
| | Styrene content 37%. |
| S-EP Diblock 2: | Shell Kraton G1702X |
| | polystyrene-poly(ethylene/propylene) |
| | Styrene content 28%. |
| Mineral Oil: | FINA Vestan A360B |
| | White paraffinic oil |
| | Viscosity 223 mm$^2$/sec at 20° C. |
| | Specific Gravity 0.863 at 20° C. |
| Antioxidant #1: | Irganox 1010 (Ciba-Geigy) |
| Antioxidant #2: | Irganox 1076 (Ciba-Geigy) |
| UV stabiliser: | Tinuvin 327 (Ciba-Geigy) |

Processing

All gels were made on a Z-blade mixer, mixing the above ingredients for 50 minutes, at 195°–200° C. under vacuum.

TMA softening point (Ts) and Dynamic storage modulus (G') were measured as described in the aforementioned WO8800603, except that the modulus was measured at 0.1 Hz to approximate more closely the conditions of real end use.

Extender exudation: samples are discs of gel (15 mm diameter×5 mm thickness) which are supported inside 15 mm diameter holes cut in a metal block. The lower surface of each disc is supported on a fine mesh, to provide free surface for extender loss. A constant pressure of 50 kPa is applied to the top surface by means of a weighted piston. The whole assembly is placed in an oven at 60° C., and a weight loss from each disc monitored with time. The M (infinity) value quoted is the mass of extender lost at equilibrium, expressed as a percentage of the original mass.

A. Hard S-Gels

|  | I (control) | II | III | IV | V | VI | VII |
|---|---|---|---|---|---|---|---|
| S-EB-S Triblock (T) | 12 | 11 | 10.5 | 10 | 10.7 | 9.75 | 8.6 |
| S-EP Diblock (D) | 0 | 4 (G1701) | 6 (G1701) | 8 (G1701) | 4 (G1702) | 6 (G1702) | 8 (G1702) |
| Mineral oil | 86.38 | 83.38 | 81.88 | 80.38 | 83.68 | 82.63 | 81.78 |
| Antioxidant 1 | 0.12 | 0.12 | 0.12 | 0.12 | 0.12 | 0.12 | 0.12 |
| Antioxidant 2 | 1.0 | 1.0 | 1.0 | 1.0 | 1.0 | 1.0 | 1.0 |
| UV stabilizer | 0.5 | 0.5 | 0.5 | 0.5 | 0.5 | 0.5 | 0.5 |

Properties

|  | I | II | III | IV | V | VI | VII |
|---|---|---|---|---|---|---|---|
| G' @ 0.1 Hz (kPa) | 6.5 | 7.3 | 7.2 | 6.7 | 7.5 | 6.7 | 6.4 |
| TS (°C.) | 128 | 119 | 115 | 116 | 125 | 127 | 117 |
| M inf (%) | 28 | 12 | 5 | 1 | 10.5 | 6.5 | 3.5 |

B. Soft S-Gels

|  | I (control) | II | III | IV | V | VI |
|---|---|---|---|---|---|---|
| S-EB-S Triblock (T) | 7 | 7 | 6.5 | 6.5 | 6 | 5.67 |
| S-EP Diblock (D) | 0 | 2 (G1702) | 4 (G1702) | 2 (G1701) | 4 (G1701) | 2 (G1701) |
| Mineral oil | 91.38 | 89.38 | 87.88 | 89.88 | 88.38 | 90.71 |
| Antioxidant 1 | 0.12 | 0.12 | 0.12 | 0.12 | 0.12 | 0.12 |
| Antioxidant 2 | 1.0 | 1.0 | 1.0 | 1.0 | 1.0 | 1.0 |
| UV stabilizer | 0.5 | 0.5 | 0.5 | 0.5 | 0.5 | 0.5 |

Properties

|  | I | II | III | IV | V | VI |
|---|---|---|---|---|---|---|
| G' 0.1 Hz (kPa) | 2.0 | 2.0 | 2.1 | 1.9 | 2.0 | 1.6 |
| Ts (°C.) | 117 | 109 | 105 | 103 | 111 | 104 |
| M inf (%) | 65 | 44 | 38 | 46 | 41 | 48 |

We claim:

1. A gel composition comprising:
   (a) a styrene-elastomeric block-styrene triblock copolymer (T);
   (b) a hard block-elastomeric block diblock copolymer (D), the elastomeric block of which is compatible with extender E, the amount of D being sufficient to reduce by at least 10% the exudation of E from the composition when under compression in use; and
   (c) more than 300 parts by weight of extender liquid (E) per 100 parts by weight of T+D, which liquid extends and softens the elastomeric blocks of T and of D, the composition containing less than 10% by weight based on the whole composition of added hydrogenated styrenic tackifier resin.

2. A gel composition according to claim 1 containing less than 10% by weight of any added tackifier.

3. A gel composition according to claim 1 containing substantially none of the added tackifier.

4. A gel composition comprising:
   (a) a styrene-elastomeric block-styrene triblock copolymer (T);
   (b) a hard block-elastomeric block diblock copolymer (D), the elastomeric block of which is compatible with extender E, the amount of D being sufficient to reduced by at least 10% the exudation of E from the composition when under compression in use; and
   (c) at least 500 parts by weight of extender liquid (E) per 100 parts by weight of T+D, which liquid extends and softens the elastomeric blocks of T and of D, wherein T and D continue substantially all of the polymer content of the gel.

5. A gel composition according to claim 1, containing more than 3.1% of T by weight of the composition.

6. A gel composition according to claim 1, wherein the weight ratio of D:T is within the range of 5:95 to 66:34.

7. A gel composition according to claim 1, wherein the weight average molecular weight (Mw) of T is at least 120,000, and the Mw of D is 100,00–200,000.

8. A gel composition according to claim 1, wherein the amount of D is sufficient to reduce the exudation of E by at least 20%.

9. A gel composition according to claim 1, wherein T and D constitute substantially all of the polymer content of the gel.

10. A gel composition according to claim 1, comprising at least 500 parts by weight of E per 100 parts by weight of T+D.

11. A gel composition according to claim 1, wherein the extender E is substantially non-aromatic paraffinic/naphthenic mineral oil of parafinnic:naphthenic carbon ration within the range from 1.75:1 to 5:1.

12. A gel composition according to claim 1 wherein the weight of D included is up to 16.5 percent, and the weight of T included is up to 23.75 percent, of the total weight of the composition, provided that the combined weight of T and D is not more than 25 percent of the total weight of the composition.

13. A gel composition according to claim 1, wherein the hard blocks of D are compatible with the polystyrene blocks of T.

14. A gel composition according to claim 1, wherein the elastomeric blocks of D are compatible with the elastomeric blocks of T.

15. A gel composition according to claim 1, wherein the elastomeric blocks of T and the elastomeric blocks of D comprise polyalkylene blocks.

16. A gel composition according to claim 1, wherein D incorporates not more than 50 weight percent of the hard blocks.

17. A gel composition according to claim 1, wherein T incorporates 29 to 35 weight percent of the polystyrene blocks.

18. A gel composition according to claim 1 containing at least 4% of T by weight of the composition.

19. A device comprising an enclosure for electrical wires or cables or connections, a body of a gel composition according to claim 1, and means for holding the body of gel composition in compression against and around the wires or cables or connections so as to protect the wires, cables or connections from contamination and/or corrosion.

20. A device according to claim 19, wherein the body of the gel composition is held in an insert shell for insertion in the enclosure.

21. A device according to claim 19 capable of closure around an object with one or more bodies of the gel composition carried by the device arranged to make gel-to gel surface contact upon such closure so as to form a gel-to gel seal which separates at the contact surfaces upon re-opening of the closure.

22. The use of a gel composition according to claim 1 for forming a seal around an object, or between a first object and a second object, preferably with the gel composition under compression when forming the seal.

23. A method of sealing an enclosure about an object, comprising:
 (a) providing an open enclosure member carrying a body of a gel composition according to claim 1;
 (b) placing the enclosure member about the object and fixing or closing the enclosure member thereabout, thereby;
 (c) bringing part of the body of gel into sealing surface contact with another part of that body, or with part of another such body of gel carried by the enclosure member, or with the said object; and
 (d) securing the enclosure member so as to hold the gel composition in the said sealing contact, preferably under compression.

24. The gel composition according to claim 2 containing substantially none of the added tackifier.

25. The gel composition according to claim 4, containing more than 3.1% of T by weight of the composition.

* * * * *